United States Patent [19]

Hayes et al.

[11] Patent Number: 5,085,347
[45] Date of Patent: Feb. 4, 1992

[54] PRESSURIZED DISPENSER PACKAGE

[75] Inventors: Thomas H. Hayes, Lancaster; Lewis C. LoMaglio, Pickerington, both of Ohio

[73] Assignee: Anchor Hocking Corporation, Lancaster, Ohio

[21] Appl. No.: 645,097

[22] Filed: Jan. 24, 1991

Related U.S. Application Data

[60] Division of Ser. No. 361,379, Jun. 5, 1989, Pat. No. 5,016,783, which is a continuation-in-part of Ser. No. 186,262, Apr. 26, 1988, Pat. No. 4,836,423.

[51] Int. Cl.$^5$ .................................................. B67B 5/00
[52] U.S. Cl. ............................ 222/153; 222/402.1; 222/534; 222/507; 239/288.5; 239/573
[58] Field of Search ............... 222/538, 537, 530, 102, 222/402.1, 507, 153, 534; 239/573, 337, 288.5

[56] References Cited

U.S. PATENT DOCUMENTS

| | | | |
|---|---|---|---|
| 2,361,647 | 10/1944 | Nyden | 222/386 |
| 2,998,165 | 8/1961 | De Elorza | 222/182 |
| 3,088,636 | 5/1963 | Spatz | 222/391 |
| 3,094,255 | 6/1963 | Hunter | 222/507 |
| 3,104,034 | 9/1963 | Sagarin et al. | 239/357 |
| 3,358,890 | 12/1967 | Dalfo | 222/538 |
| 3,371,827 | 3/1968 | Micallef | 222/536 |
| 3,680,790 | 8/1972 | Boris | 222/402.1 |
| 3,847,313 | 11/1974 | Micallef | 222/507 |
| 3,870,200 | 3/1975 | Spatz | 222/386 |
| 4,474,313 | 10/1984 | Sieverding | 222/464 |
| 4,779,773 | 10/1988 | Bennett | 222/507 |
| 4,998,649 | 3/1991 | Thanisch | 222/507 |

*Primary Examiner*—Kevin P. Shaver
*Assistant Examiner*—Gregory L. Huson
*Attorney, Agent, or Firm*—Wood, Herron & Evans

[57] ABSTRACT

A container for fluent material having a nozzle for dispensing the material with the nozzle being moved into dispensing position and also being actuated by a slidably mounted container cover. The container may be, for instance, a pressurized container for dispensing an aerosol product or a pump container equipped with, for example, a ball check valve for dispensing a fluent mass material.

11 Claims, 5 Drawing Sheets

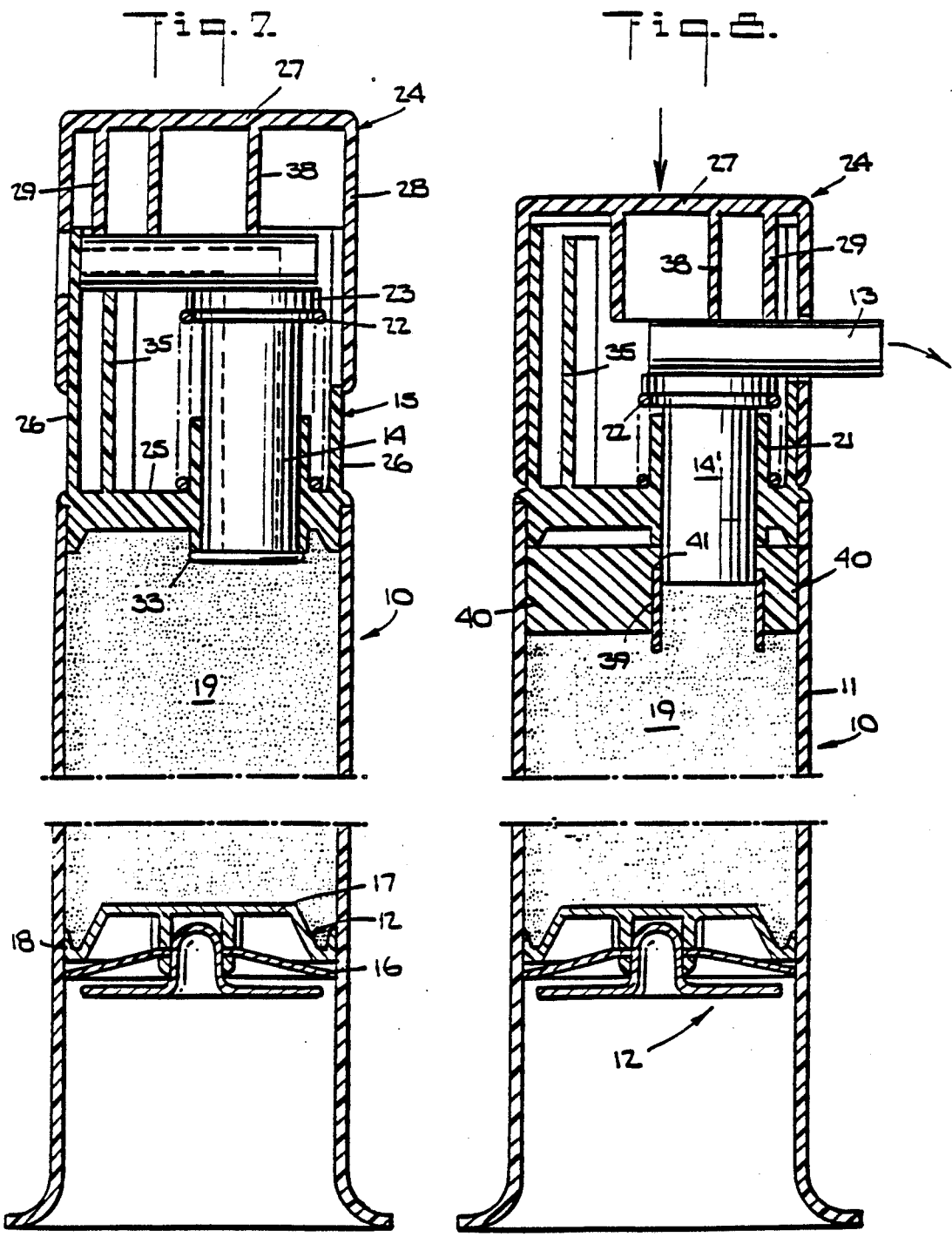

PRESSURIZED DISPENSER PACKAGE

RELATED APPLICATION FOR U.S. PATENT

This is a division of application Ser. No. 361,379, filed June 5, 1989, now U.S. Pat. No. 5,016,783, which is a continuation-in-part application for U.S. patent of U.S. patent application assigned Ser. No. 186,262, filed on Apr. 26, 1988 and issued into U.S. Pat. No. 4,836,423.

FIELD OF THE INVENTION

The present invention relates to pump or pressurized dispensers for fluent materials, and more particularly to a container from which the fluent material is discharged by a pump or valve stem actuated by the container cover.

BACKGROUND

There are prior patents in which the squeezing of an elastic container, or pressing of a plunger into an upper portion of the container forces a fluent mass through a discharge outlet. See for example, U.S. Pat. Nos. 4,474,313; 3,870,200; 3,847,313; 3,371,827; 3,088,636; and 2,361,647; and French Patent No. 1,070,728. There is also a prior patent in which a valve stem off-set eccentrically from the center axis of a pressurized container is disclosed which can be actuated to dispense an aerosol therefrom by pressing the activating portion of the cover. See U.S. Pat. No. 3,371,827.

SUMMARY OF THE INVENTION

In the present invention, a combined pump and nozzle element or nozzle element mounted on a centrally located valve stem of a pressurized container via an adaptor can be turned from a closed position to a dispensing position and actuated by a movable package cover. The discharge nozzle is open continuously but has an outlet shielding member protecting the fluent material in the nozzle when it is moved to the stored or closed position. In one embodiment, the viscosity of the fluent material in the container plus the shield causes the fluent material to resist withdrawal back through the nozzle while atmospheric pressure acting upon a follower piston in the container moves the piston against the fluent mass.

In other embodiments of this invention, a fluent material is contained in a body portion with a pump, nozzle and cover combination mounted at its top, or an aerosol material is contained in a pressurized container with a centrally located valve stem, nozzle and cover combination mounted on its top. The cover combination is rotatably mounted on the body portion of the container so that it may be turned through a half turn from a nozzle closed position to a nozzle open dispensing position. As to those containers containing a fluent material, the nozzle is coupled to a pump and cover so that, when the cover is rotated to the open position, the cover can be pressed up and down moving the nozzle and pump in a pumping motion for dispensing the fluent material from the container. With respect to the pressurized containers, the nozzle is coupled to an adaptor and cover so that, when the cover is rotated to the open position, the cover can be depressed moving the nozzle and adaptor in a downward direction to actuate the valve stem for dispensing the aerosol material from the pressurized container.

Thus, it can be readily appreciated that an unique feature of the instant invention is to provide a container with a rotatable cover which is manipulated both for opening and closing the nozzle and for dispensing product from the container. Other and further unique features of the present invention will become apparent upon an understanding of the illustrative embodiments about to be described, or will be indicated in the appended claims, and various advantages not referred to herein will occur to one skilled in the art upon employment of the invention in practice.

BRIEF DESCRIPTION OF THE FIGURES

Exemplary embodiments of the invention have been chosen for purposes of illustration and description and are shown in the accompanying figures, forming a part of the specification, wherein:

FIG. 7 is a vertical sectional view of the container taken along line 7—7 of FIG. 1;

FIG. 8 is a corresponding vertical sectional view with the cover and interconnected pump in their lowered position and illustrating another embodiment incorporating a product striping means within the container;

DESCRIPTION OF THE PREFERRED EMBODIMENT

Figure 1:
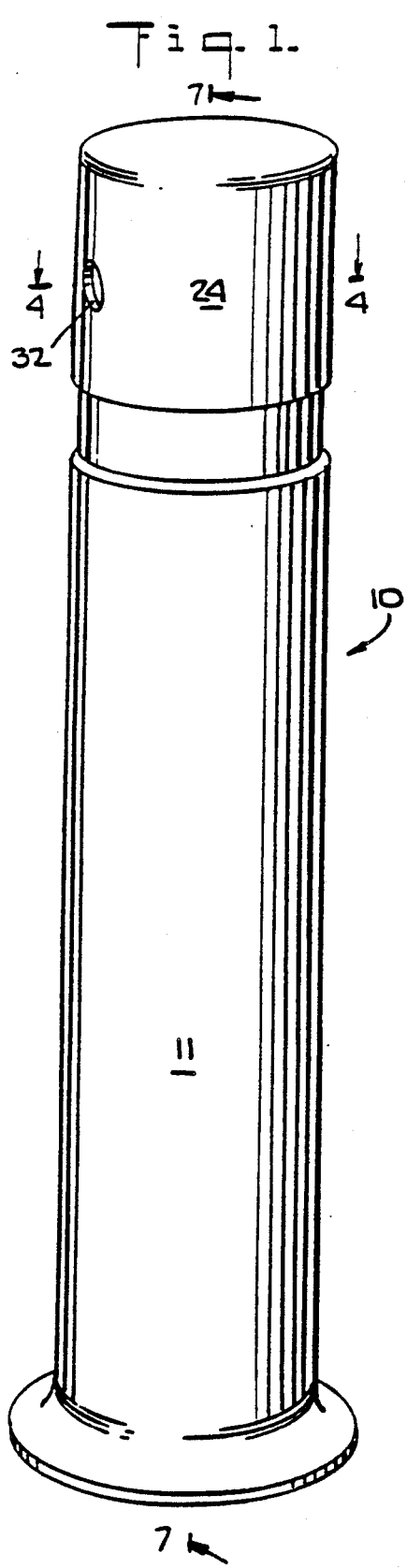
FIG. 1 is a perspective view of the package of the invention.
Figure 2:
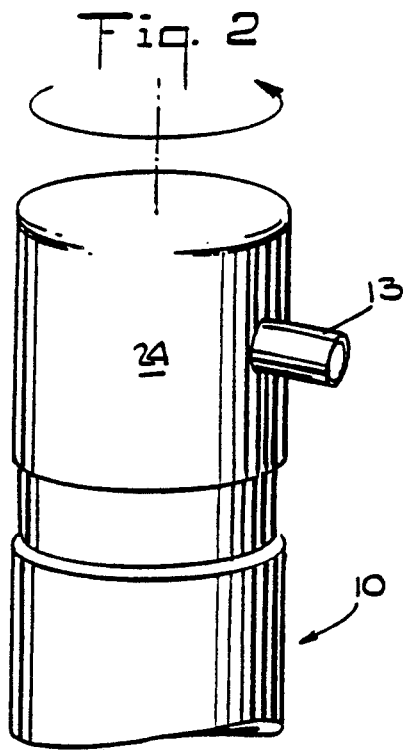
FIG. 2 is a fragmentary perspective view of the package in its opened dispensing condition.

As illustrated in the figures, the dispenser includes a container 10 of any suitable material with a container body 11 of cylindrical shape which is adapted to contain an aerosol material or a fluent material, such as a cosmetic, lotion, liquid soap or detergent, shampoo, syrup, molasses, honey, liquid cleaning agent, water or other similar materials.

As described hereinbelow and illustrated in FIGS. 7-8, a follower 12 is movable in an upward forward direction, after dispensing a portion of the fluent mass or material from the container 10, being caused to move upwardly in the container 10 a distance corresponding to the volume of the fluent material discharged through a nozzle 13. A pump 14 mounting head 15 is secured to or formed as the forward end of the container body 11.

Air at atmospheric pressure shifts the follower or piston 12 in a forward direction and its return movement in the container 10 is prevented by a one-way latch 16 forming part of the piston 12. The piston 12 includes a main body 17 having a central hub and an outer rim. The main body 17 may be made of a suitable material, such as polyethylene, being provided with a forward seal 18 extending laterally outwardly.

The seal 18 sealingly engages the inner wall of the cylindrical container body 11 and is forced by the pressure of the fluent mass 19 in the container 10 to prevent leakage rearwardly past the piston 12.

The latch 16 moves in a forward direction within the container 10 under the influence of atmospheric pressure, and any tendency of the latch 16 to move rearwardly in the container 10 causes the outer ends of the latch 16 to grip or latch against the inner wall of the container 10. The one-way follower or piston 12 moves forwardly within the container 10 but is prevented from moving rearwardly. The one-way latch device 16 is made of a suitable flexible material, such as steel, phosphor, bronze, acetal, and the like.

Nozzle 13 comprises a hollow molded plastic member communicating with a downwardly depending hollow pump 14. Pump 14 is slidably mounted in a bearing 21 molded on the container head 15. Container head 15 may be separately molded and attached to the cylindrical body 11, or container head 15 and container body 11 may be molded as a unit. The pump 14 is urged toward its raised position by a coil spring 22 positioned between container head 15 and a flange 23 formed at the junction of nozzle 13 and pump 14. When pump 14 is moved downwardly against the force of coil spring 22, the lower portion of pump 14 enters the fluent material 19 in container body 11 forcing it upwardly through pump 14 and out of nozzle 13. A bead 33 determines the upper position of pump 14.

Package head 15 and cooperating package cover 24, which act to provide for the pumping action as well as the nozzle opening and closing actions, will now be more fully described.

Whether formed integrally with container body 11 or separately, container head 15 has a horizontal end portion 25 closing the top of container body 11. Extending upwardly from horizontal end portion 25 is an outer cylindrical cover mounting portion 26 which rotatably mounts the cup shaped package cover 24. Package cover 24 has a top 27 and a depending skirt 28 slidably engaging the cover mounting portion 26 on container head 15 so that package cover 24 may be moved upwardly and downwardly as well as rotated relative to container head 15.

Figure 4:
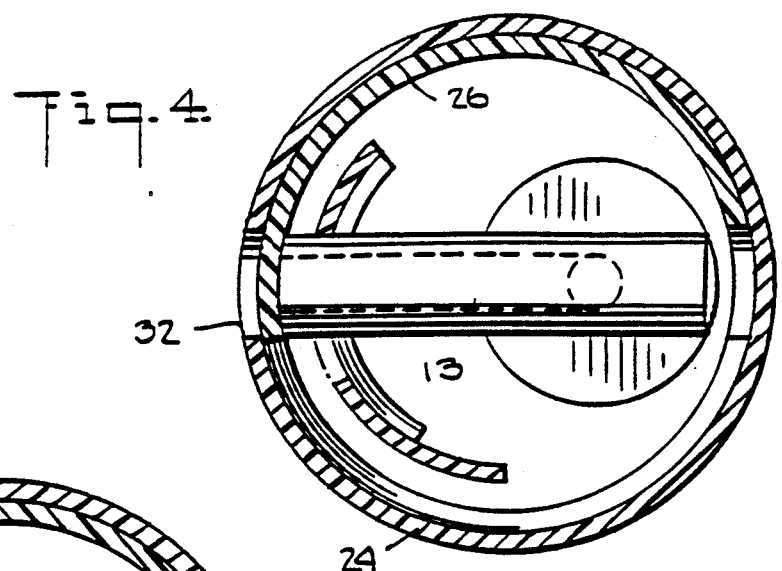
FIG. 4 is a sectional view taken along line 4—4 of FIG. 1 illustrating the nozzle in its closed position.
Figure 5:
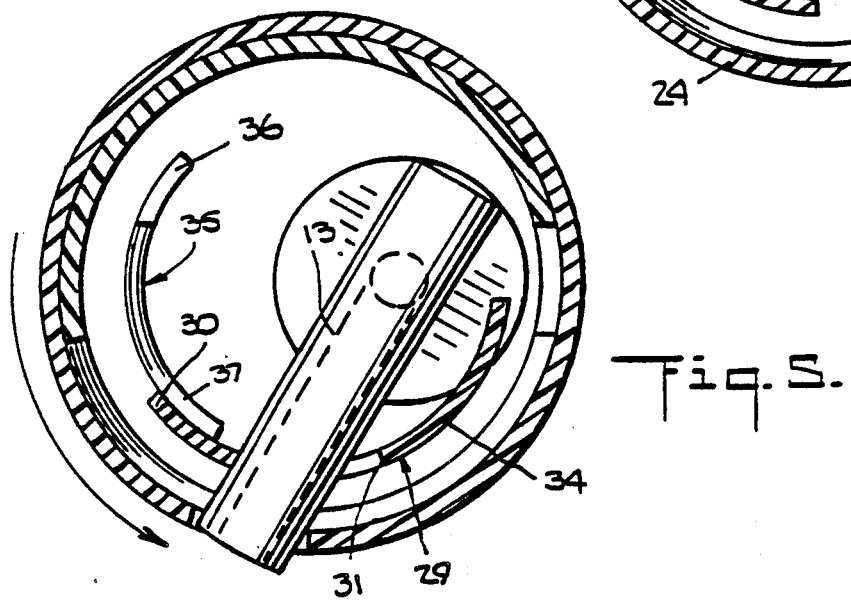
FIGS. 5 and 6 are sectional views based on FIG. 4 showing the nozzle in partially opened and fully opened positions respectively.
Figure 6:
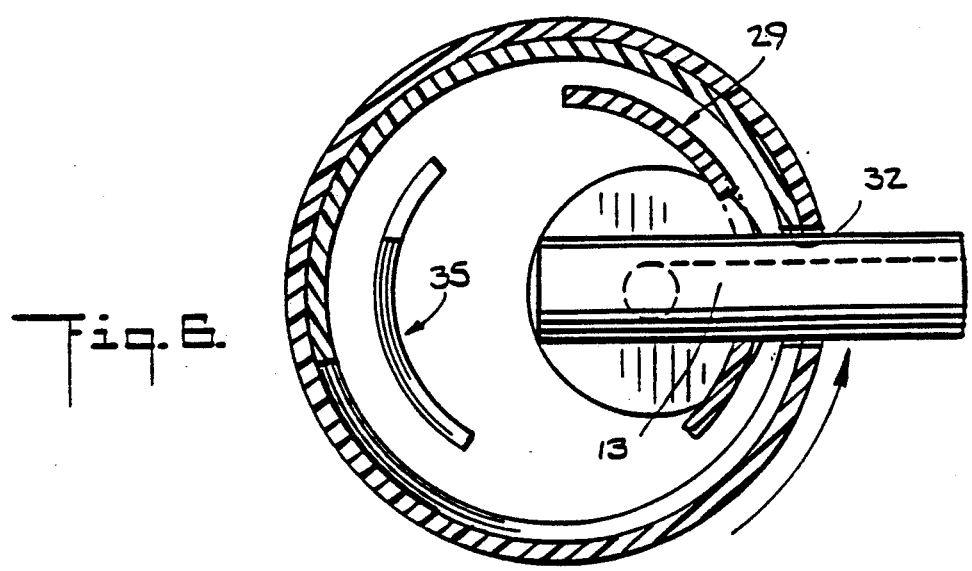

Package cover 24 has a depending arcuate nozzle control member 29 (FIGS. 4 thru 7) with a drive portion 30 adjacent a nozzle opening 31. Rotation of package cover 24 from its closed position, as depicted in FIGS. 1 and 4, causes nozzle 13 to move through the opening 31 in member 29 and an opening 32 in package cover 24, as shown in FIGS. 5 and 6. Nozzle 13 movement outwardly of container 10 results from the eccentric positioning of nozzle 13 bearing 21 on container head 15.

A second drive portion 34 on member 29 turns nozzle 13 back to its closed position when package cover 24 is rotated back to the closed position.

A stop and pump controlling member 35 is positioned on package cover 24 inwardly of control member 29, as best illustrated in FIGS. 4 thru 7. This upstanding arcuate member 35 has a raised end portion 36 which terminates the rotation of package cover at 24 its closed position, as illustrated in FIG. 4, by engaging the outer end of nozzle 13. A lower rail portion 37 of controlling member 35 engages the bottom of nozzle 13 to hold it in its raised position in the nozzle closed position, as seen in FIG. 4, as well as during the initial portion of the opening movement as package cover 24 is turned counterclockwise through the positions illustrated in FIGS. 5 and 6. FIG. 5 illustrates the partially opened position and FIG. 6 illustrates the fully opened position of package cover 24 with nozzle 13 projecting therefrom.

FIG. 5 illustrates nozzle 13 first entering aperture 32 of package cover 24 as the nozzle 13 is partially turned toward its dispensing position and FIG. 6 illustrates nozzle 13 fully extended through aperture 32 in its final dispensing position after a half turn of package cover 24.

A pusher 38 depending downwardly from a central portion of package cover 24 operates to force nozzle 13 downwardly during the pumping action, as illustrated in FIG. 8.

In its closed position, opening 32 of nozzle 13 is moved into sliding engagement with the top portion of the cover mounting portion 26. This acts as a partial seal for nozzle 13 when package cover 24 is in its closed position.

Figure 3:
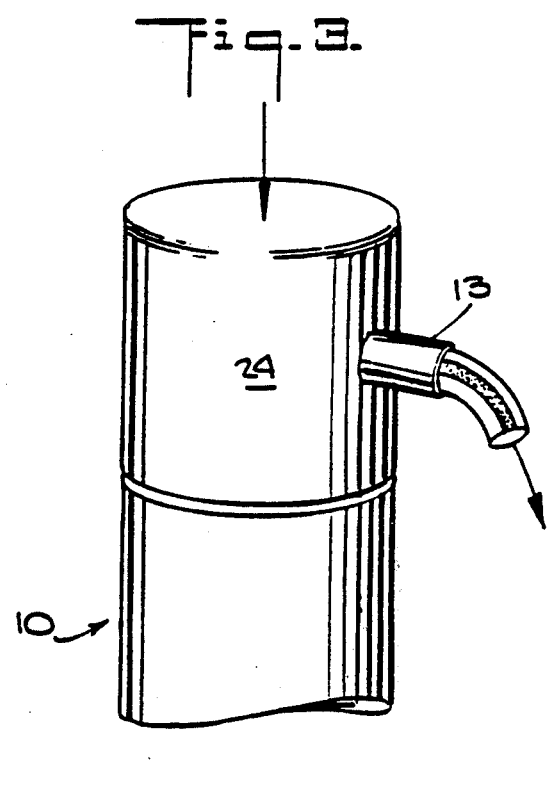
FIG. 3 is a fragmentary perspective view illustrating the package cover in its downward or dispensing position with a striped product being dispensed from the package nozzle.

FIG. 8 illustrates package cover 24 in its lowest dispensing position but in combination with a package similar to that of FIGS. 1 thru 7 with the further addition of a product striping element. The striping element comprises a generally cylindrical chamber 39 formed at the top of container body 11 for containing the striping material 40. The striping material 40 is contained between container body 11 outer walls and the chamber 39 surrounding pump 14. A number of apertures 41 at the top of the inner wall pass striping material 40 into the moving fluent material 19 as follower 12 moves upwardly after a pumping cycle. In this embodiment which is also illustrated in FIG. 3, striping material 40 is mixed with the other material in providing a striped pumped product such as a striped toothpaste. Pump 14 (FIG. 8) is shorter than pump 14 (FIG. 7) to provide a space beneath it in its raised position for entry of the striping material through apertures 41.

Figure 9:
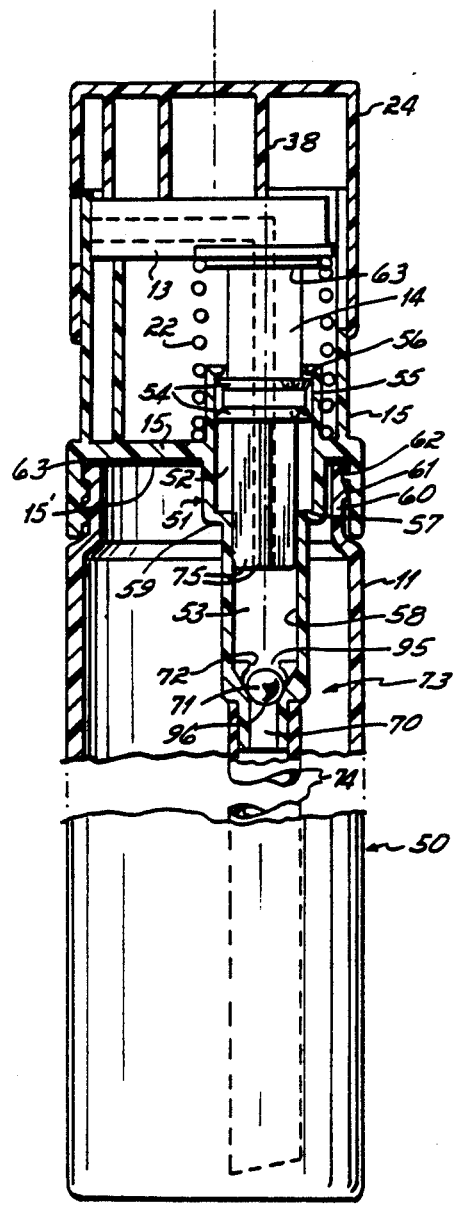
FIG. 9 is a vertical sectional view similar to FIG. 7 but illustrating an alternative embodiment of the instant invention in combination with a ball check valve.

As a further alternative, pressurized containers or pump containers equipped with for example ball check valves and dip tubes may be constructed in accordance with the teachings of the present invention. For instance, in FIG. 9, a pump container designated generally at 50 is shown having a nozzle 13 which comprises a hollow molded plastics member communicating with a downwardly dependending hollow pump 14. Pump 14 is slideably mounted in a piston chamber 51 on container head 15. Container head 15 and container body 11 may be molded as an integral unit, or container head 15 may be separately molded and attached to neck portion 60 of container body 11 via corresponding screw threads 61, 62 provided on the neck portion 60 and container head 15, respectively, as depicted in FIG. 9. Pump 14 is urged toward its raised position by a coil spring 22 positioned between container head 15 and a register 63 formed at the junction of nozzle 13 and pump 14. Between container head 15 and container body 11 is a venting gasket 63 and a venting scratch on inner surface 15' of container head 15 (not shown) for venting the interior of container body 11 to atmosphere. Venting gasket 63 can be formed of any suitable material, such as foamed plastic, and such venting gaskets are well known to those versed in this field of art.

The piston chamber 51 as shown in FIG. 9, comprises upper and lower chambers 52, 53, respectively, in which pump 14 is slidabley mounted. In upper piston chamber 52, pump 14 is provided with a dual piston seal 54 for slideably engaging the inner side walls 55 of upper piston chamber 52 when pump 14 is urged toward its raised and lowered positions. Piston seal 54 may be formed of any suitable material, such as a pliable plastic, and is integrally molded to pump 14. Bottom flange 57 of upper piston chamber 52 determines the lower position of pump 14.

The lower piston chamber 53, also illustrated in FIG. 9, comprises inner side walls 58 and seat 59. The lower portion of pump 14 is provided with fins 75 arranged in a cruciform cross-section (not shown) for slideably engaging inner side walls 58 when pump 14 is urged toward its raised and lowered positions. Seat 59 acts in conjuction with bottom flange 57 of upper piston chamber 52 to determine the lower position of pump 14. The lower piston chamber 53 further includes a hollow neck 70 and a ball 71 in a hollow chamber 72 having openings 95, 96 for communication with lower piston chamber 53 and hollow neck 70, respectively, to form a ball check valve 73. Attached to hollow neck 70 is a downwardly depending hollow dip tube 74. Like container head 15 and container body 11, hollow dip tube 74 and hollow neck 70 may be molded as an integral unit, or hollow dip tube 74 may be separately molded and sealingly secured to hollow neck 70. In addition, while pump 14 is described above as having fins 75 for slideably engaging inner side walls 58, it should be understood that pump 14 can be consturcted of any suitable shape or form, such as a solid hollow cylinder or the like, for slideably engaging inner side walls 58.

In use, package cover 24 is first rotated from its closed position to its open position in a counterclockwise direction for exposing nozzle 13, as described in greater detail hereinabove. Once opened, package cover 24 is pumped, i.e., pushed up and down, so that pusher 38 operates to force nozzle 13 and pump 14 downwardly and coil spring 22 operates to force nozzle 13 and pump 14 upwardly during the pumping action. After dispensing from nozzle 13 a portion of fluent mass (not shown) from container body 11, as a result of urging nozzle 13 and pump 14 downwardly, as nozzle 13 and pump 14 are urged toward their upper position via coil spring 22 air at atmospheric pressure shifts the fluent mass in container body 11 upwardly through hollow dip tube 74 and into lower piston chamber 53 to displace the portion of fluent mass dispensed from nozzle 13.

Piston seal 54 sealingly engages inner side walls 55 of upper piston chamber 52 to prevent leakage of fluent mass upwardly past pump 14. In addition, piston seal 54 in conjunction with fins 75 of pump 14, which engage inner side walls 58 of lower piston chamber 53, prevent air from entering into container body 11 via piston chamber 51, since fins 75 act to guide pump 14 and prevent piston seal 54 from disengaging the inner side walls 55 during the pumping action. Nevertheless, venting gasket 63 permits air to enter into the upper portion of container body 11 for the purpose of displacing the volume of fluent mass dispensed from nozzle 13 during and following the pumping action. As an alternative to venting gasket 63, a venting orifice (not shown in FIG. 9) may be used in upper piston chamber 52 to vent the upper portion of container body 11 to atmosphere. In this embodiment, however, venting orifice should be positioned on upper piston chamber 52 such that when pump 14 is urged upwardly away from fluent mass 19 in container body 11 it is closed to atmosphere whereas when pump 14 is urged downwardly toward fluent mass 19 in container body 11 it is opened to atmosphere.

Once the desired amount of fluent mass 19 has been dispensed from nozzle 13, packaged cover 24 is rotated in a clockwise direction from its opened position to its closed position for retracting and concealing nozzle 13.

Figure 9A:
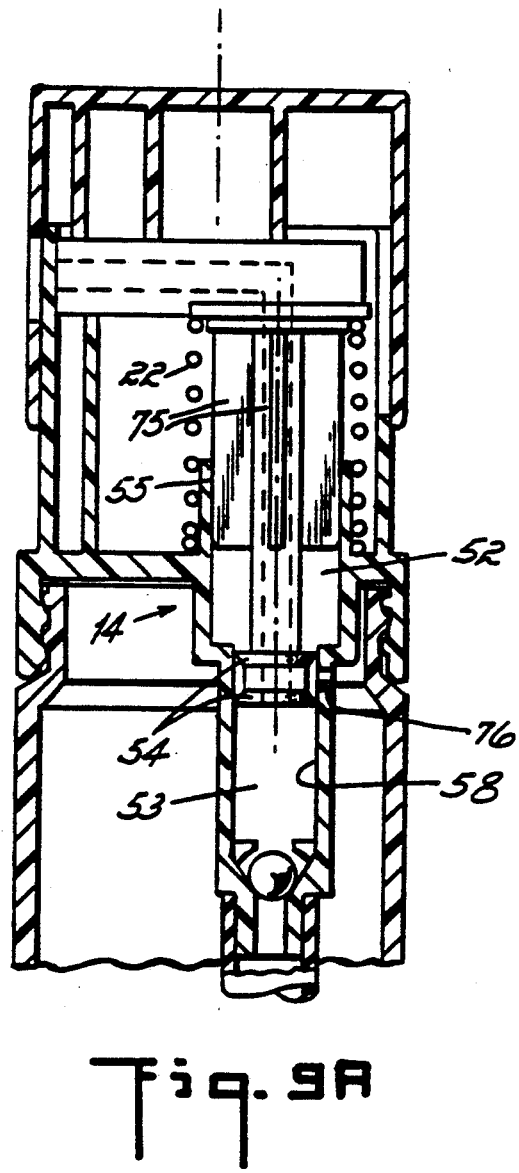
FIG. 9A is a vertical sectional view similar to FIG. 9 but illustrating an alternative pump and venting arrangement.

As an alternative to pump 14 and piston chamber 51 described in FIG. 9, a pump and piston chamber as illustrated in FIG. 9A may be employed. More particularly, the upper section of pump 14 is equipped with fins 75 in cruciform cross section for slideably engaging the inner side walls 55 of upper piston chamber 52 and is provided with dual piston seal 54 on the lower section thereof for slideably engaging inner side walls 58 of lower piston chamber 53 when pump 14 is urged toward its raised and lowered positions during the pumping action. Moreover, venting orifice 76 in lower piston chamber 53 may be used in place of venting gasket 63 to vent the interior of container body 11 to atmosphere. It should therefore be understood to those versed in this art, especially in view of the alternative arrangements illustrated in FIGS. 9 and 9A, that the orientation of dual piston seal 54 and fins (guides) 75 and the system selected to vent container body 11, e.g., a venting gasket or venting orifice, are not critical to the instant invention and alternatives which do not defeat the objectives of the this invention may therefore be employed.

Figure 10:
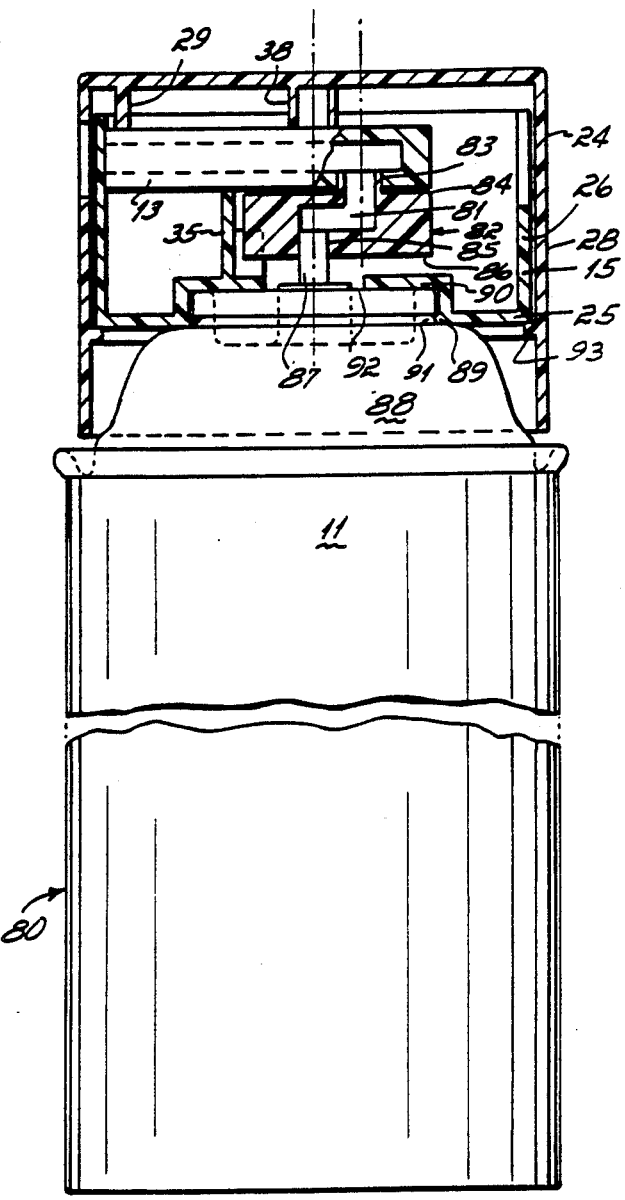
FIG. 10 is a vertical sectional view similar to FIG. 7 but illustrating an alternative embodiment of the instant invention in combination with a pressurized container.

Turning now to FIG. 10, a pressurized container, such as an "aerosol," designated generally at 80 is shown having a nozzle 13 which comprises a hollow molded plastic member in communication with channel 81 within stationary adaptor 82. More particularly, nozzle 13 is mounted on a hollow pivot spout 83 of stationary adaptor 82 which extends upwardly from top surface 84 thereof for permitting nozzle 13 to rotate from a concealed, retracted position to an exposed, extended position when package cover 24 is rotated in a counterclockwise direction from a closed to an opened position. Stationary adaptor 82 is further provided with a bore 85 in the bottom surface 86 for receiving a centrally located valve stem 87 of pressurized container body 11 for communicating centrally located valve stem 87 with nozzle 13 via channel 81 and hollow pivot spout 83.

As further illustrated in FIG. 10, pressurized container 80 is provided with a container head 15 having a horizontal end portion 25 adapted to mount onto the outer cylindrical dome 88 of pressurized container body 11. Extending upwardly from horizontal end portion 25 is an outer cylindrical cover mounting portion 26 which rotatably mounts package cover 24, as referenced earlier hereinabove. Also extending upwardly from horizontal end portion 25 is a stop or actuation controlling member 35 for preventing accidental actuation of valve stem 87 when package cover 24 is in the closed postion, as also previously described herein and depicted in FIGS. 4 thru 7. Extending inwardly from horizontal end portion 25 is a circumferential rib 89 and lock 90. Container head 15 is secured to outer cylindrical dome 88 of pressurized container body 11 by circumferential rib 89 and lock 90 which are inserted into the circumferential collar 91 and onto top 92 on cylindrical dome 88, respectively. As indicated hereinbefore, package cover 24 is provided with a depending skirt 28 which slidably engages outer cylindrical mounting portion 26 so that package cover 24 may be moved upwardly and downwardly as well as rotated relative to container head 15.

It should, of course, be understood that depending skirt 28 should be of a length sufficient to permit actuation of valve stem 87 when package cover 24 is rotated to its opened position and pushed downwardly. Extending inwardly from depending skirt 28 is circumferential stop or lock 93 which prevents package cover 24 from being removed or separated from container head 15.

Extending downwardly from package cover 24 is a depending arcuate nozzle control member 29 (FIG. 4 thru 7) for rotating nozzle 13 from a concealed, retracted to an exposed, extended position when package cover 24 is rotated from a closed to an open position, as described in greater detail hereinbefore. Once nozzle 13 has been exposed, valve stem 87 can be actuated by pusher 38 depending downwardly from a central portion of package cover 24 which forces nozzle 13 and stationary adaptor 82 downwardly when package cover 24 is depressed. After dispensing a selected amount of the aerosol product, package cover 24 can be rotated to its closed position to retract and conceal nozzle 13 and prevent nozzle 13 from being accidentailly actuated via stop 35.

As various changes may be made in the form, construction and arrangement of the invention and without departing from the spirit and scope of the invention, and without sacrificing any of its advantages, it is to be understood that all matter herein is to be interpreted as illustrative and not in a limiting sense.

Having thus described our invention, we claim:

1. A pressurized dipsenser package for an aerosol material comprising:
   a pressurized container for the aerosol material, said pressurized container having a valve stem located on one end thereof for releasing the aerosol material contained therein when actuated;
   a nozzle having an outlet;
   means for connecting said nozzle to the valve stem of said pressurized container and for communicating the interior of said pressurized container with said nozzle when the valve stem is actuated;
   a hollow cover mounted on said container adjacent said nozzle for rotational and reciprocable motion;
   said cover operatively coupled to the valve stem for pushing the valve stem to actuate the valve stem when said cover is reciprocated in a downward direction; and
   means for moving said nozzle outlet into and out of said cover during a rotary movement of said cover.

2. The pressurized package as recited in claim 1 which comprises means for covering said nozzle outlet when said nozzle is within said cover.

3. A pressurized package as recited in claim 1 in which said nozzle moving means comprises an eccentric mounting on said cover for said nozzle on said pressurized container.

4. A pressurized package as recited in claim 1 in which said cover comprises an aperture for passing said nozzle to a dispensing position.

5. A pressurized package as recited in claim 1 in which said cover comprises a top, depending skirt and a valve stem pusher on the underside of said top.

6. A pressurized package as recited in claim 1, said valve stem being centrally located on the one end of said pressurized container.

7. A pressurized dispenser package for an aerosol material comprising:
   a pressurized container for the aerosol material, said pressurized container having a valve stem located on one end thereof for releasing the aerosol material contained therein when actuated;
   a nozzle having an outlet;
   means for connecting said nozzle to the valve stem of said pressurized container and for communicating the interior of said pressurized container with said nozzle when the valve stem is actuated;
   a hollow cover mounted on said container adjacent said nozzle for rotational and reciprocable motion;
   said cover operatively coupled to the valve stem for pushing the valve stem when said cover is reciprocated in a downward direction;
   means for moving said nozzle outlet into and out of said cover during a rotary movement of said cover; and
   head means for mounting on said pressurized container and cooperating with said cover, so that when said cover is mounted on said head means, said cover may be moved toward and away from said pressurized container and rotated relative to said head means.

8. A pressurized package as recited in claim 7, said valve stem being centrally located on the one end of said pressurized container.

9. A pressurized package as recited in claim 7, said head means further comprises a stop member for preventing said nozzle from being depressed and actuating the valve stem when said nozzle is within said cover.

10. A pressurized package as recited in claim 7, said head means further including a nozzle opening for cooperating with the aperture in said cover when said nozzle is rotated to a dispensing position.

11. A pressurized package as recited in claim 7, said head means further including a lock member for preventing said cover from being removed from said head means.

* * * * *